United States Patent [19]
Fried

[11] 3,840,786
[45] Oct. 8, 1974

[54] PRECISION TRIMMER CAPACITOR
[75] Inventor: Harvey Fried, Brooklyn, N.Y.
[73] Assignee: Sprague-Goodman Electronics, Inc., Mineola, N.Y.
[22] Filed: Jan. 31, 1974
[21] Appl. No.: 438,486

[52] U.S. Cl............................................. 317/249 T
[51] Int. Cl............................................. H01g 5/22
[58] Field of Search .................... 317/249 R, 294 T

[56] References Cited
UNITED STATES PATENTS
3,275,913  9/1966  Blanchard...................... 317/249 T
3,536,967  10/1970  Johanson........................ 317/249 T Primary Examiner—E. A. Goldberg
Attorney, Agent, or Firm—Connolly & Hutz

[57] ABSTRACT

A precision trimmer capacitor of the piston or cup type is disclosed having a self-aligning torque loading anti-backlash mechanism, a self-aligning and non-distorting stop mechanism, a two point non-binding suspension system, and a precision orbitally spun connection between the bolt and the cup. The self-alignment and anti-distortion features of this construction depend on the precision of the spun connection to be fully operative.

4 Claims, 5 Drawing Figures

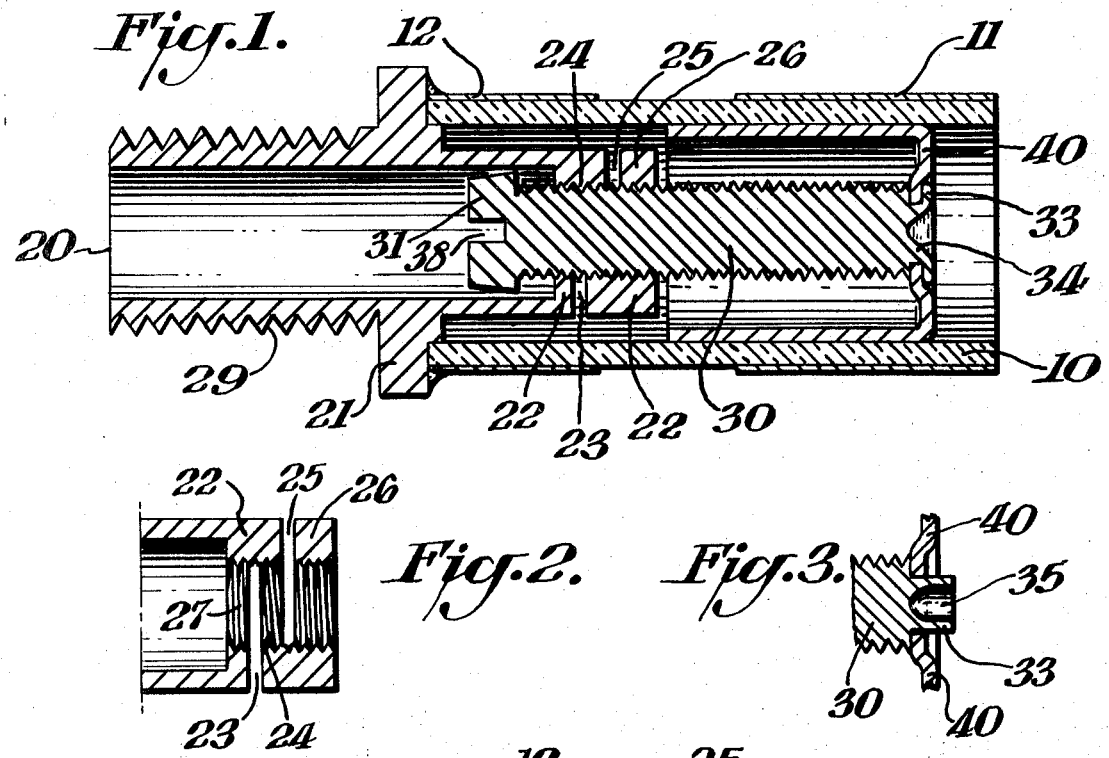
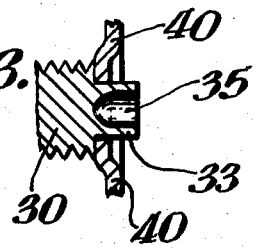
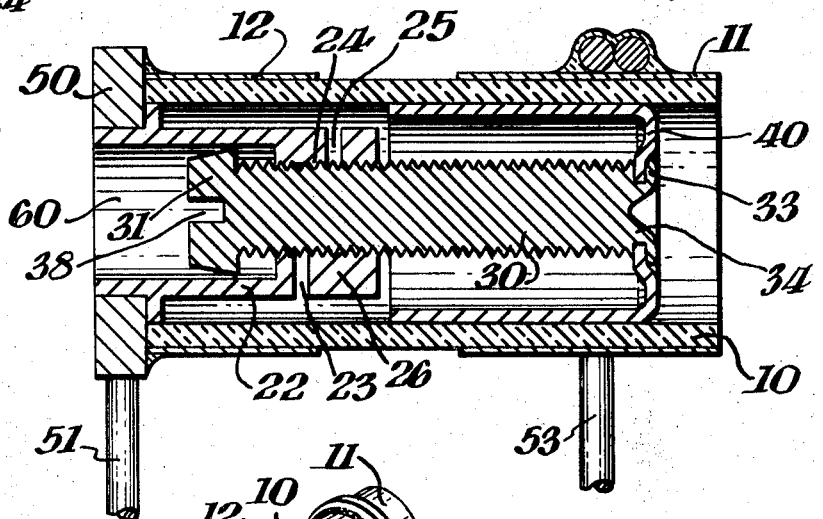
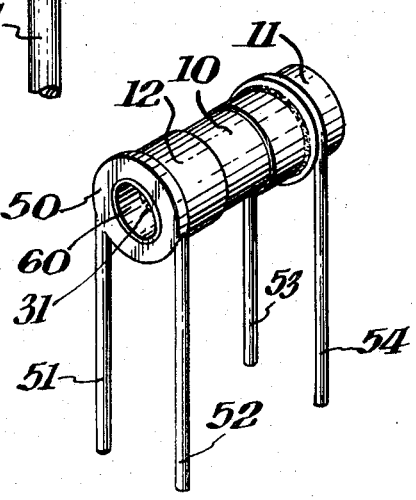

PRECISION TRIMMER CAPACITOR

BACKGROUND OF THE INVENTION

The present invention relates to adjustable capacitors, and more particularly to miniature coaxial trimmer capacitors used for radio frequency tuning applications.

Typically coaxial trimmer capacitors have a metal piston or cup that serves as one electrode of the capacitor and that is adjusted axially within a glass sleeve which carries a second electrode near one of its ends. The relative positions of the two electrodes determines the capacity at any instant.

It has long been recognized that precise coaxial alignment should be maintained to assure smooth operation, high resolution, high stability under physical shock and vibration, and long life. Furthermore it is crucial in a precision trimmer capacitor to eliminate backlash in the adjusting mechanism.

In typical prior constructions, the aforementioned cup is mounted at the tip of a threaded bolt. The bolt is mounted in a threaded bottom portion of a metal tube-like part that in turn is mounted to the aforementioned glass sleeve. Anti-backlash means are usually provided at the mating threaded portions of metal tube and bolt. Most such means have a tendency to coaxially misalign the bolt and thus the cup within the glass sleeve. Furthermore, previous constructions include a means for fastening the cup to the bolt that require a fastening process which itself tends to distort and/or coaxially misalign the parts. Finally, in use, when adjusting for maximum or minimum capacity a mechanical stop is typically provided and the stop means typically tends to distort the assembly in an anti-coaxial alignment, or to distort the joint between the bolt and the cup.

It is therefore an object of the present invention to provide a precision trimmer capacitor having high resolution stability, and long life.

It is a further object of this invention to provide a precision trimmer capacitor having a highly precise means for coaxially fastening the cup to the bolt.

It is a further object of the present invention to provide a precision trimmer capacitor having a coaxially aligning torque loading and anti-backlash mechanism.

It is a further object of this invention to provide a precision trimmer capacitor having adjustment stop means that avoid the introduction of coaxial misalignment and distortion forces.

SUMMARY OF THE INVENTION

A precision trimmer capacitor is described having a cylindrical glass sleeve with an electrode layer in contact therewith and a generally cylindrical tube mounted partially therein. The tube bottom has a coaxial threaded hole and two oppositely cut equally wide slots at right angles to the axis thereof, the depth of the slots being substantially greater than the outer radius of the tube bottom. A bolt, threadingly engaged therein, has a projection that passes through a hole in a metal cup and an orbitally spun connection made therebetween. The cup serving as the outer electrode has a slide fit within the glass sleeve. The bolt head has a diameter less than that of the metal tube to prevent binding therein.

The slotted portion of the tube serves as a coaxially self-aligning anti-backlash mechanism with respect to the bolt. The two extreme positions of the cup within the sleeve for maximum and minimum capacity are determined by the bolt head being stopped against the bottom of the tube and the lip of the cup being stopped against an outer flange portion of the tube, respectively. At the later stop position, a self-alignment action of cup relative to sleeve occurs. The efficacy of the self-alignment features of this invention depend upon a precisely aligned connection between bolt and cup which is accomplished by orbital spinning.

BRIEF DESCRIPTION OF THE DRAWINGS

In FIG. 1 is shown a preferred embodiment of the capacitor of the present invention, wherein all elements except the centrally located bolt are shown in cross-section.

In FIG. 2 is shown a detail drawing of the slotted end of the threaded tube with the bolt removed.

In FIG. 3 is shown a detail drawing of the bolt projection, positioned in the hole of the cup as seen in cross-section prior to making a spun connection therebetween.

In FIG. 4 is shown in cross-section another embodiment of the capacitor of this invention.

In FIG. 5 is shown an isometric view of the capacitor of FIG. 4 with corresponding numbers designating the elements.

DESCRIPTION OF THE PREFERRED EMBODIMENT

In FIG. 1 is shown in cross-section a precision trimmer capacitor of the present invention. A cylindrical glass sleeve 10 has a conductive layer 11 overlying one end. This layer 11 serves as one of the capacitor electrodes. In general, the electrode layer 11 may not necessarily lie on the outer surface of glass sleeve 10 but may be a buried layer. A second conductive layer 12, overlies the other end. A generally cylindrical metal tube 20 has an outer flange portion 21 that abuts the glass sleeve 10 and is attached thereto by means of soldering to layer 12. Tube 20 also has a bottom portion 22 that has a coaxial threaded hole. In this threaded bottom portion 22 are two slots 23 and 25 being about equally wide and having been cut from opposite sides and at right angles to the axis of the tube 20. Between slots 23 and 25 there remains a metal slice 24, and between the bottom end of the tube 20 and slot 25 there remains a metal slice 26. These slices are also approximately equally wide.

In FIG. 2 is shown a detail in cross-section of the threaded and slotted bottom portion 22 of metal tube 20. An axial compressive force having been applied to the tube 20, the slices 24 and 26 are bent in an axial direction so that the threads therein are generally compressed relative to the threads 27 in the unslotted region of the tube bottom.

Thus, with reference to FIG. 1, when a bolt 30 is threadingly engaged therein, the slice portions 24 and 26 act as leaf springs and exert an entirely axial force on the threads of bolt 30 so as to provide an anti-backlash mechanism. Unlike anti-backlash mechanisms used previously, there are in the present invention no misaligning radial forces applied to the bolt. The equally wide slots insure that when compressing the tube to bend the slices, an equal bending is given in the axial direction to both slices 24 and 26. The result is that instead of the usual root to crest binding between the threads of the bolt and the tube, there is rather a flank to flank thread contact in the anti-backlash structure of the instant invention. Coaxial alignment of bolt and tube is thus assured.

The bolt 30 has a small centrally positioned projection 34 at the inwardly directed end. A metal cup 40 is fitted over bolt 30 with bolt projection 34 extending through a centrally located hole in the bottom of cup 40. In the detail of FIG. 3 it is shown that the bolt protrusion originally has a cavity 35 in its end portion, forming a metal rim 33. The rim 33 is subsequently spun over the outer surface of cup 40 by an orbital spinning process and thus firmly attaching cup 40 to bolt 30. However, a cavity 35 is not essential, and in fact the cup-bolt connection has proven quite feasible and practical, using a bolt having a solid projection.

Prior means used for making the connection between bolt and cup are by staking, swaging, peening or welding. The aforementioned known mechanical processes typically involve impulse forces on the order of 500 pounds that are prone to warp and distort the bolt and its threads. Welding requires the heating, softening, and fusing of the metals to be joined which tends to flow and distort them and make coaxial alignment very difficult.

Orbital spinning, as used herein, provides a rolling member having at any instant only one point of contact with the rim 33 to be spun over. The axial force on the rim, associated with this process is on the order of 50 pounds. This relatively gentle process avoids the aforementioned warping of the bolt, the cup or any other parts of the assembly. Orbital spinning machines suitable for the instant use are made by Taumel Metalforming Corp., of Elmsford, N.Y. and by the Spinomatic Fastening Systems, Inc., of Fraser, Mich. Since in the orbital spinning process there is no sliding or rubbing contact as with other mechanical methods, the spun over bolt projection exhibits no scratches or skid marks that would otherwise be apparent.

The bolt 30 has a head 31 that is larger in diameter than the threaded hole in the bottom of tube 20, so that when the bolt 30 is turned so as to move inward, the head eventually hits the tube bottom and stops. This position corresponds to the closest relative position of the electrode cup 40 and the electrode layer 11, and therefore to maximum capacity. Even if the mating surfaces between bolt head 31 and tube bottom, in this position, are not perfectly flat or in a perfectly radial plan, the misalignment forces relative to coaxial positions have such low leverage, that no misalignment or distortion of parts is likely.

Where the bolt 30 is turned so that the bolt is withdrawn, the maximum bolt excursion in this direction is stopped when the rim of the cup hits flange 21. At this relatively large radial distance from the axis of the assembly, the contact between the cup and the flange have a high leverage force that tends to reinforce coaxial alignment between the cup and the rest of the assembly. If, as with many known trimmer capacitors, the cup were stopped against the tube bottom, definite and strong misalignment forces would be present, since the anti-backlash mechanism of the present invention includes bent slice members 24 and 26, and the outer bottom surface of the tube 20 is a surface of bent slice 26.

Certain inadvertent misalignments of the cup 40 from perfect coaxial position relative to glass sleeve 10, will tend to correct itself as the bolt is turned, in the construction of the present invention. This occurs by a slight corrective bending of the bottom of the cup if the bolt to cup joint is precisely centered. The bolt head 31 necessarily has a diameter that is smaller than the inner diameter of tube 20 so that a slight tipping of the bolt from coaxial alignment will not cause the head 31 to contact the inner wall of the tube 20 and consequently cause it to bind there. Thus the bolt 30 is only constrained from tipping by its threaded contact with the tube 20 and by contact between cup 40 and sleeve 10, namely only at two points. Severe three point binding is avoided altogether and the above mentioned self-alignment mechanism becomes fully operative.

In the construction of a precision trimmer capacitor of the present invention it is seen that it is essential to employ a fastening means between the bolt and the cup that is precisely aligned and mechanically sound. Such a joint as is formed by orbital spining makes it possible for the self-aligning torque loading and anti-backlash features, the self-aligning anti-distortion stop feature, and the self-correcting two point suspension system of the present invention to become simultaneously and fully operable.

In the preferred embodiment described above, electrical access to the capacitor is obtained by contacting with wires or by other convenient conduction means, the conductive electrode layer 11 and the metal tube 20.

The left most portion of tube 20, as shown is designed for mounting in a hole, provided therefore in a printed wire board or metal chassis. The tube may be held therein by fitting a threaded nut to the outer threads 29 of tube 20. A groove 38 is provided in the head 31 facilitating the turning of bolt 30 by a screwdriver, and thereby adjusting the capacity.

There are numerous alternative ways by which the capacitor of this invention may be mounted and connected into a circuit. In FIG. 4 there is shown in cross-section a trimmer capacitor of this invention having four essentially parallel leads extending from the body, that are intended for insertion and subsequent soldering into the holes of a printed circuit board. The tube 60 is similar to tube 20 of FIG. 1 having corresponding element numbers except that it is designed for coaxial mating to a metal washer 50 and is welded or otherwise bonded thereto. The washer 50 has welded thereto, two lead wires 51 and 52 as seen more clearly in the isometric view of FIG. 5. The washer 50 is soldered to layer 12. The other two leads 53 and 54 are formed by wrapping a wire about the electrode layer 11 and soldering thereto.

Precision trimmer capacitors have been built according to the first preferred embodiment of the present invention. The tube 20 was of half hard brass having an outer diameter in the bottom portion 22 of 0.160 inch and having a number 3–56 threaded hole. The slots were 0.011 wide and having a radial depth of 0.040 inch as measured from the axis of tube 20. The slices 24 and 26 were 0.024 inch wide. At the other end of tube 20, the inside diameter was 0.124 inch and the diameter of bolt head 30 was 0.117 inch.

Although the depth of the slots may be varied to achieve a particular desired amount of compressive force on the threads of the bolt, it is preferred in the practice of this invention that the slots are just deep enough to interrupt the inner tube threads 360 degrees, as shown in FIGS. 1 and 2.

The bolt projection prior to spinning had an outer diameter of 0.0595 inch. The bottom hole in the cup 40 had an inside diameter of 0.0615 inch. The cup was made of drawn steel and had an outer diameter of 0.2098 inch. The inner diameter of the glass sleeve 10 was 0.2100 inch.

What is claimed is:

1. A precision trimmer capacitor comprising:
   a. a cylindrical glass sleeve;
   b. a conductive layer lying in contact with said sleeve near one end thereof, said layer serving as a first electrode of said capacitor;
   c. a generally cylindrical metal tube having an outer flange portion, said tube also having a bottom portion at one extremity thereof, said bottom portion having a threaded hole, said hole having a smaller diameter than the inner portion of said tube and being concentric therewith, said one extremity of said metal tube extending coaxially part way into said glass sleeve at the other end thereof and said flange being attached thereto, said threaded bottom portion of said tube having two equally wide slots cut at right angles to said axis near said tube extremity, said slots each having a depth substantially greater than the outer radius of said metal part, said slots being separated in an axial direction from each other and from said one extremity of said tube creating two metal slices of approximately equal width, said slots being cut from opposite sides of said tube, said slots being slightly tapered as from bending said slices in a compressive axial direction;
   d. a metal bolt threadingly engaging said metal part, said bolt having a small centrally positioned projection at the inwardly directed end and a head at the other end; and
   e. a metal cup serving as the second electrode of said capacitor, said cup having a sliding fit within said tube and having a hole in the center of a bottom portion, said cup being firmly attached to said bolt in accurate coaxial alignment therewith by said cup being positioned over said bolt and said bolt projection having a close fit within said hole, said extension protruding further beyond said hole and having been spun over the outer surface of said cup bottom by an orbital spinning process, to permit said cup to move axially while simultaneously rotating smoothly with said tube in variable spacial relationship relative to said first electrode when said bolt head is turned, said axial movement of said cup being limited in one direction when the lip of said cup contacts said flange and being limited in the other direction when said bolt head contacts said tube bottom.

2. The trimmer capacitor of claim 1 wherein the mean inside diameter of said threaded hole is smaller than the inside diameter of said tube, and wherein said bolt head has a diameter less than said inside diameter of said tube, so that any misalignment from perfect coaxial positions of the elements of said capacitor may cause frictional binding therebetween at only two points, namely a region of contact between said cup and said tube, and in the region of said threaded portion of said metal part.

3. The trimmer capacitor of claim 1 wherein said slices have a width that is less than said wall thickness in said threaded bottom portion of said tube.

4. The trimmer capacitor of claim 1 wherein said slots are of such a depth that said inner thread is interrupted 360°.

* * * * *